US008196704B2

(12) United States Patent
Chiou et al.

(10) Patent No.: US 8,196,704 B2
(45) Date of Patent: *Jun. 12, 2012

(54) LINEAR ACOUSTIC LINER

(75) Inventors: Song Chiou, Cerritos, CA (US); Jia Yu, San Diego, CA (US); Claude Hubert, Riverside, CA (US); Michael Layland, Bonita, CA (US); Hwa-Wan Kwan, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/047,408

(22) Filed: Mar. 14, 2011

(65) Prior Publication Data

US 2011/0162910 A1 Jul. 7, 2011

Related U.S. Application Data

(63) Continuation of application No. 12/190,805, filed on Aug. 13, 2008, now Pat. No. 7,921,966.

(60) Provisional application No. 60/956,043, filed on Aug. 15, 2007.

(51) Int. Cl.
*E04B 1/84* (2006.01)
*B64D 33/02* (2006.01)
*E04B 1/82* (2006.01)
*B64D 33/00* (2006.01)

(52) U.S. Cl. ........ 181/292; 181/288; 181/214; 181/296; 244/53 B

(58) Field of Classification Search .................. 181/292, 181/288, 214, 291, 290, 222, 296; 244/1 N, 244/53 B; 415/119
See application file for complete search history.

(56) References Cited

U.S. PATENT DOCUMENTS

| | | | |
|---|---|---|---|
| 1,833,143 | A | 11/1931 | Weiss |
| 2,361,652 | A | 10/1944 | Radabaugh et al. |
| 2,805,730 | A | 9/1957 | Applegate |
| 3,166,149 | A | 1/1965 | Hulse et al. |
| 3,502,171 | A | 3/1970 | Cowan |
| 3,508,838 | A | 4/1970 | Martenson |
| 3,529,693 | A | 9/1970 | Woodward et al. |

(Continued)

FOREIGN PATENT DOCUMENTS

DE 10212811 C1 10/2003

(Continued)

OTHER PUBLICATIONS

Official Action (JP Appln. No. 2008-207710; filed Aug. 12, 2008) mailed Oct. 29, 2010, pp. 1-4.

(Continued)

*Primary Examiner* — Edgardo San Martin
(74) *Attorney, Agent, or Firm* — Womble Carlyle Sandridge & Rice, LLP

(57) ABSTRACT

A linear acoustic liner for an aircraft includes a cellular core having a first surface and an opposed second surface. A substantially imperforate back skin covers the first surface, and a perforate face skin covers the second surface of the core. The perforate face skin includes an outer face skin layer having a first plurality of spaced openings, an inner face skin layer having a second plurality of spaced openings, and a porous layer disposed between the outer face skin layer and the inner face skin layer. Each of the first plurality of spaced openings are substantially aligned with one of the second plurality of spaced openings.

12 Claims, 5 Drawing Sheets

U.S. PATENT DOCUMENTS

| | | | |
|---|---|---|---|
| 3,621,934 | A | 11/1971 | Thrasher et al. |
| 3,630,312 | A | 12/1971 | Woodward et al. |
| 3,890,060 | A | 6/1975 | Lipstein |
| 3,910,374 | A | 10/1975 | Holehouse |
| 3,937,590 | A | 2/1976 | Mani |
| 3,948,346 | A | 4/1976 | Schindler |
| 4,049,074 | A | 9/1977 | Kazin |
| 4,064,961 | A | 12/1977 | Tseo |
| 4,091,160 | A | 5/1978 | Koss |
| 4,100,993 | A | 7/1978 | Feder |
| 4,104,002 | A | 8/1978 | Ehrich |
| 4,112,164 | A | 9/1978 | Koss |
| 4,137,992 | A | 2/1979 | Herman |
| 4,147,578 | A | 4/1979 | Koss |
| 4,150,732 | A | 4/1979 | Hoch et al. |
| 4,185,688 | A | 1/1980 | Wiater et al. |
| 4,226,297 | A | 10/1980 | Cicon |
| 4,231,447 | A | 11/1980 | Chapman |
| 4,240,519 | A | 12/1980 | Wynosky |
| 4,249,976 | A | 2/1981 | Hudson |
| 4,271,219 | A | 6/1981 | Brown |
| 4,294,329 | A | 10/1981 | Rose et al. |
| 4,313,524 | A | 2/1982 | Rose |
| 4,410,065 | A | 10/1983 | Harvey |
| 4,433,751 | A | 2/1984 | Bonneau |
| 4,441,578 | A | 4/1984 | Rose |
| 4,465,725 | A | 8/1984 | Riel |
| 4,671,841 | A | 6/1987 | Stephens |
| 4,743,740 | A | 5/1988 | Adee |
| 4,786,231 | A | 11/1988 | Kelley |
| 4,817,756 | A | 4/1989 | Carr et al. |
| 4,828,932 | A | 5/1989 | Morimoto et al. |
| 5,022,943 | A | 6/1991 | Zaima |
| 5,041,323 | A | 8/1991 | Rose et al. |
| 5,175,401 | A | 12/1992 | Arcas et al. |
| 5,659,158 | A | 8/1997 | Browning et al. |
| 5,702,231 | A | 12/1997 | Dougherty |
| 5,782,082 | A | 7/1998 | Hogeboom et al. |
| 5,888,610 | A | 3/1999 | Fournier et al. |
| 6,360,844 | B2 | 3/2002 | Hogeboom et al. |
| 6,539,702 | B2 | 4/2003 | Nishimura et al. |
| 6,755,280 | B2 | 6/2004 | Porte et al. |
| 6,811,372 | B1 | 11/2004 | Emborg et al. |
| 6,840,349 | B2 | 1/2005 | Andre et al. |
| 7,419,031 | B2 | 9/2008 | Liguore et al. |
| 7,921,966 | B2 * | 4/2011 | Chiou et al. .................. 181/292 |
| 2004/0016595 | A1 | 1/2004 | Andre et al. |
| 2005/0006529 | A1 | 1/2005 | Moe et al. |
| 2008/0118699 | A1 | 5/2008 | Jumel |
| 2008/0179448 | A1 | 7/2008 | Layland et al. |
| 2009/0166127 | A1 | 7/2009 | Thomas et al. |
| 2009/0173572 | A1 | 7/2009 | Grenzing et al. |
| 2009/0250293 | A1 | 10/2009 | Gleine et al. |

FOREIGN PATENT DOCUMENTS

| | | |
|---|---|---|
| EP | 0911803 | 4/1999 |
| EP | 1111584 | 6/2001 |
| JP | 63116197 A | 5/1988 |

OTHER PUBLICATIONS

English translation of Official Action (JP Appln. No. 2008-207710; filed Aug. 12, 2008) mailed Oct. 29, 2010, pp. 1-4.

Official Action dated Jun. 6, 2011 issued in corresponding CA Appln No. 2638706.

Extended European Search Report dated Jul. 11, 2011 issued in corresponding European Patent Application No. EP 08014662.4.

* cited by examiner

LINEAR ACOUSTIC LINER

RELATED APPLICATIONS

This application is a Continuation of U.S. patent application Ser. No. 12/190,805, filed Aug. 13, 2008, which claims priority to U.S. provisional application Ser. No. 60/956,043 filed Aug. 15, 2007. The contents of the aforementioned applications are incorporated by reference in their entirety.

FIELD OF THE INVENTION

The invention relates to noise attenuation structures for aircraft, and more particularly relates to a linear acoustic liner for aircraft engine nacelles and the like.

BACKGROUND

Acoustic attenuation panels are known for lining the walls of nacelles of aircraft jet engines. Such acoustic structures often are referred to as acoustic liners. Generally, acoustic liners include a cellular core, such as a honeycomb structure, covered on its exterior side by an acoustically resistive front skin, and, on the opposite side, with a reflective back skin. Such a structure is known as a single degree of freedom (SDOF) acoustic liner. Other acoustic liners include a pair of superimposed honeycomb cores separated by a second acoustically resistive layer (or septum), an acoustically resistive front skin, and a reflective back skin, and are known as double degree of freedom (DDOF) liners. Generally, SDOF acoustic liners can be preferable to DDOF acoustic liners because SDOF liners generally are less costly to produce, and are lighter in weight than DDOF liners. Linear SDOF acoustic liners can be preferable because they are capable of attenuating noise across a broader range of frequencies and operating conditions than non-linear SDOF liners.

An acoustically resistive layer is a porous structure that at least partially dissipates acoustic energy by at least partially transforming incident acoustic energy into heat. Often, the acoustically resistive layers used in acoustic liners include continuous thin sheets of material having a plurality of spaced openings or perforations, a sheet of porous layer, or a combination of both. In acoustic liners like those described above, the cells of the honeycomb structure covered by the acoustically resistive face skin form resonant cavities that contribute to the dissipation of incident acoustic energy by canceling acoustic reflected waves and or converting acoustic energy into heat, such as by Helmholtz resonance.

One example of the construction of a prior art SDOF acoustic liner is shown in FIG. 1. In this acoustic liner 10, one face of a honeycomb core 14 is covered by a perforated face sheet 16 having a plurality of spaced openings or perforations extending through its thickness. The opposite face of the core 14 is covered by a non-perforated, reflective back skin 12. The honeycomb core 14, perforated face sheet 16, and back skin 12 can be constructed of aluminum or the like. As also shown in FIG. 1, a fine porous layer 18 extends over the exterior face of the perforated face sheet 16. As an example, the porous layer 18 can be a woven layer such as a fine woven stainless steel layer. The layers 12, 14, 16, 18 of the liner 10 can be bonded together by adhesives of types generally known in the art for composite materials. In this embodiment, the porous layer 18 is positioned on the air-wetted surface of the liner 10.

The SDOF acoustic liner shown in FIG. 1 is of a type known as a linear acoustic liner. Linear liners are liners having acoustically resistive elements that have only a small dependence on the incident sound pressure level (SPL), and typically are characterized by a porous layer 18 like that shown in FIG. 1 that is external to the exterior face of the honeycomb core 14. The fine porous layer 18 provides the liner 10 with increased sound attenuation bandwidth as compared to a liner like that shown in FIG. 1 without a porous layer 18.

A second construction of a prior art SDOF linear acoustic liner 20 is shown in FIG. 2. In this arrangement, the liner 20 also includes a honeycomb core 14, an imperforate reflective back skin 12, a perforate face skin 16, and a porous layer 18. Unlike the linear liner 10 shown in FIG. 1, however, the porous layer 18 is disposed between the exterior face of the honeycomb core 14 and the perforate face sheet 16. In this arrangement, the perforate face skin 16 at least partially shields the porous layer 18 from grazing flow across the exterior face of the liner 20.

Though both of the linear acoustic liners 10, 20 described above can effectively attenuate acoustic energy over relatively wide bandwidths and operating conditions, the porous layer layers 18 of such liners 10, 20 sometimes can at least partially separate from the perforate face sheet 16 and/or honeycomb core 14. For example, the bond between a stainless steel wire layer and an aluminum face sheet or aluminum core may eventually corrode, resulting in unwanted separation of the face sheet from the core. Because such separation of layers is undesirable, there is a need for an improved SDOF linear acoustic liner that is simple in construction, and has enhanced structural durability as compared to the liners 10, 20 described above.

SUMMARY

A linear acoustic liner for an aircraft can include a cellular core having a first surface and an opposed second surface. A substantially imperforate back skin can cover the first surface of the core. A perforate face skin can cover the second surface of the core, and include an outer face skin layer having a first plurality of spaced openings extending therethrough. The perforate face skin can further include an inner face skin layer having a second plurality of spaced openings extending therethrough, and a porous layer disposed between the outer face skin layer and the inner face skin layer. Each of the first plurality of spaced openings can be substantially aligned with one of the second plurality of spaced openings.

A method of producing a linear acoustic liner can include placing a release layer between at least one outer composite layer and at least one inner composite layer, and restraining the outer and inner composite layers in a desired configuration. The method can further include curing the outer and inner composite layers in the restrained configuration, and forming a plurality of spaced openings through the cured outer and inner composite layers. In addition, the method can include separating the cured outer composite layer and the cured inner composite layer from the release layer, inserting a porous layer and a first adhesive material between the cured outer and inner layers, and realigning the spaced openings in the outer and inner composite layers. The method can further include placing the assembled inner and outer composite layers and porous layer over a first face of an open cell core with a second adhesive material therebetween, placing at least one imperforate composite layer over a second face of the open cell core, and curing the first and second adhesive materials and the back skin to form a bonded assembly.

These and other aspects of the invention will be understood from a reading of the following description together with the drawings.

DETAILED DESCRIPTION

Figure 1:
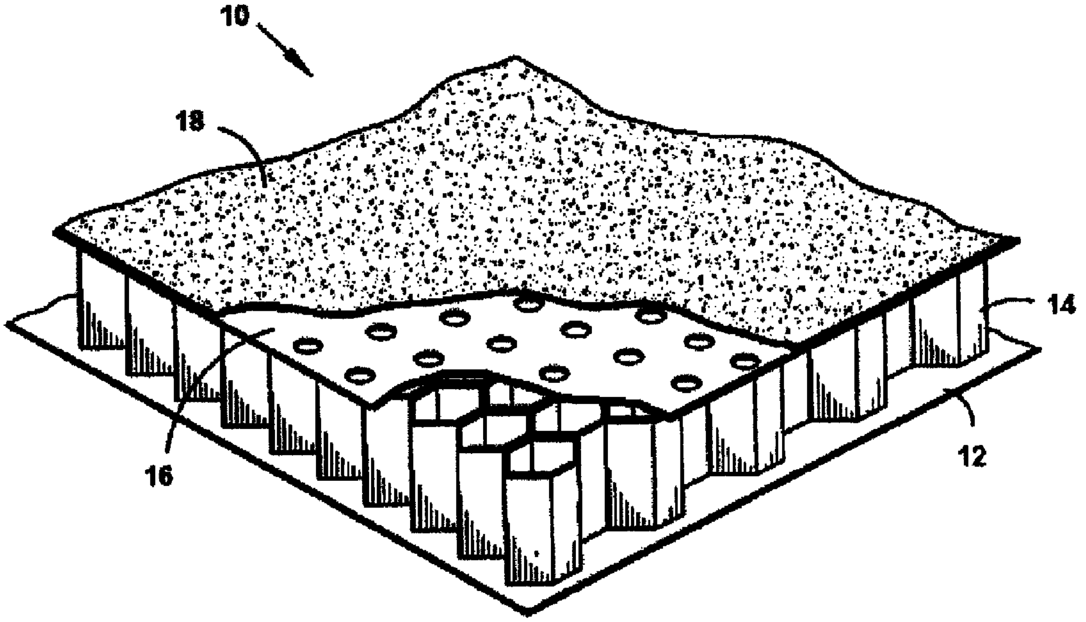
Fig. 1 (prior art)
FIG. 1 is a perspective view of a portion of a prior art SDOF linear acoustic liner.
Figure 2:
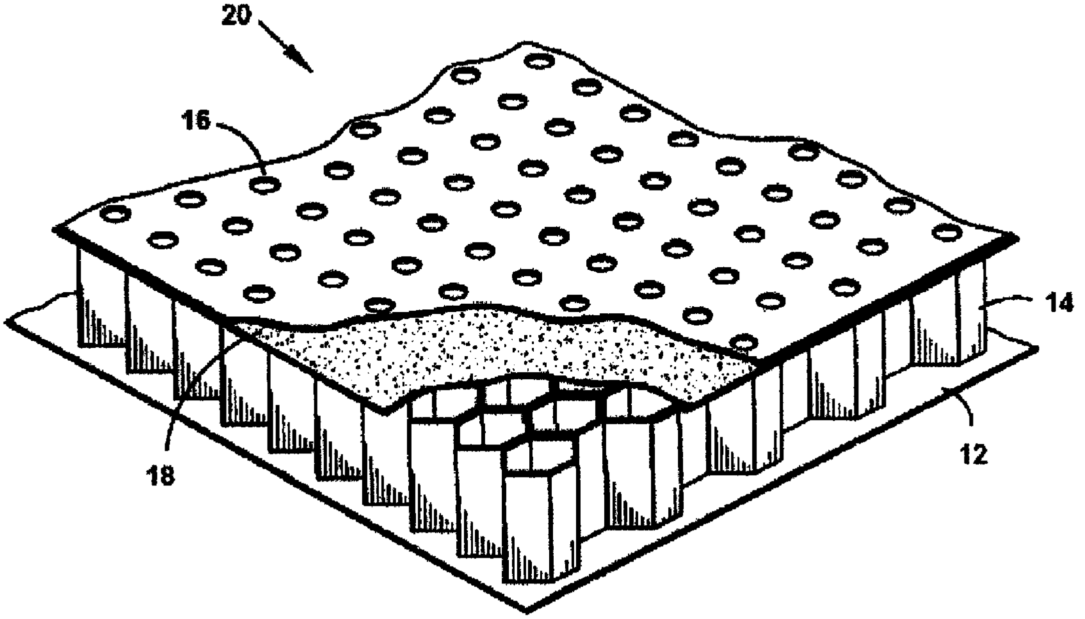
Fig. 2 (prior art)
FIG. 2 is a perspective view of a portion of another prior art SDOF linear acoustic liner.
Figure 3:
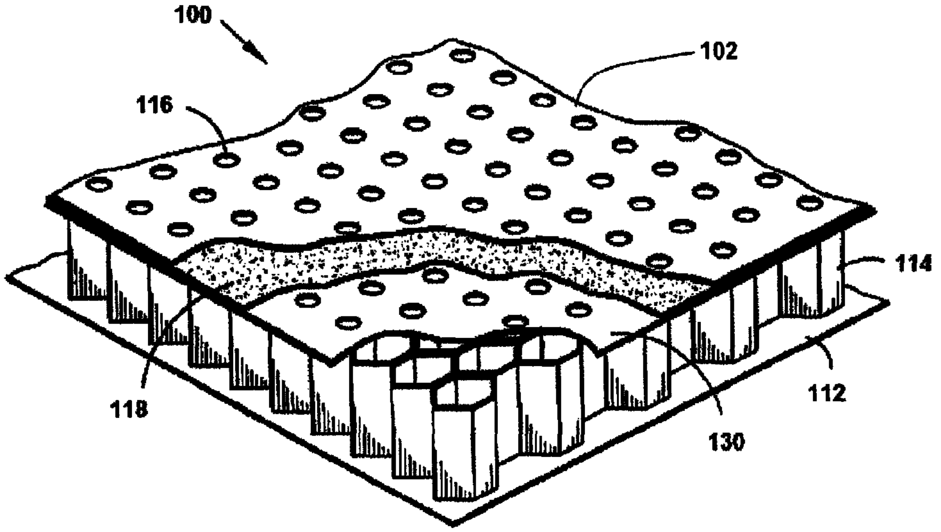
FIG. 3 is a perspective view of a portion of one embodiment of a SDOF linear acoustic liner according to the invention.
Figure 4:
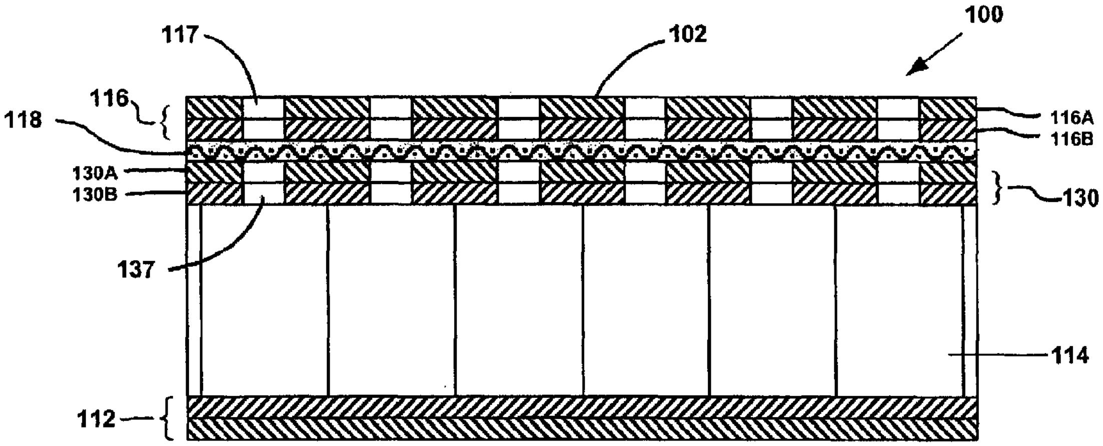
FIG. 4 is a cross section of a portion of the SDOF linear acoustic liner shown in FIGS. 3, 5A and 5B as taken along line 4-4 in FIG. 5A or FIG. 5B.

FIGS. 3 and 4 show one embodiment of a SDOF linear acoustic liner 100 according to the invention. In this embodiment, the liner 100 includes a honeycomb core 114 and an imperforate, reflective back skin 112 bonded to the back face of the core 114. As shown in FIG. 4, the back skin 112 can include a plurality of bonded layers. A multi-layer porous face skin 102 is bonded to the front face of the core 114. In the embodiment shown in FIGS. 1 and 2, the face skin 102 includes an outer perforated layer 116, an inner perforated layer 130, and a porous layer 118 disposed between and bonded to the outer and inner perforated layers 116, 130. As shown in FIG. 4, the outer perforated layer 116 can include two or more bonded layers 116A, 116B, and the inner perforated layer 130 can include two or more bonded layers 130A, 130B In one embodiment, the porous layer 118 is a sheet of fine woven stainless steel wire having a thickness of about 0.006 inch and a flow resistance of about 20 CGS Rayls (centimeter-gram-second system of units) to about 60 CGS Rayls. Alternatively, the porous layer 118 can be a fine woven polyaryletherketone (PAEK) layer, or any other thin porous material that is durable and has desired acoustic properties. For example, the porous layer 118 can be a micro-perforated polymeric film, a metallic fibrous felt, or any of a number of various other fibrous materials, including graphite, nylon, polyetheretherketone (PEEK), or the like. The outer perforated layer 116, inner perforated layer 130, and back skin layers 112 can be sheets of a composite material of a type well known in the art. For example, the perforated layers 116, 130, and back skin 112 can be comprised of carbon epoxy composite sheets.

As shown in FIG. 4, the outer perforated layer 116 of the face skin 102 includes a plurality of incrementally spaced first openings 117 extending through its thickness. The first openings 117 can be substantially any size and shape, and can have substantially any desired spacing to provide the liner 100 with desired noise attenuation properties. In one embodiment the first openings 117 can be substantially circular, and can have a diameter of about 0.03 inch to about 0.09 inch. In one embodiment, the first openings have a center-to-center spacing of about 0.09 inch to about 0.15 inch. In one embodiment, the first openings 117 provide the outer perforated layer 116 with a percent open area (POA) of about 12 percent to about 33 percent, for example. Though it may be desirable to maximize the POA for purposes of noise attenuation, the permissible POA can be limited by the natural laminar flow (NLF) requirement of the air-wetted surface of the liner 100. The first openings 117 can extend over substantially the entire surface of the liner 100, or alternatively, can extend over only a portion of the liner's surface. In addition, the first openings 117 can vary in size, shape, spacing, and/or pattern over the liner's surface. The openings 117 can be arranged in substantially any desired pattern, including square patterns, triangular patterns, diamond-shaped patterns, and the like, and any combination thereof.

As also shown in FIG. 4 the inner perforated layer 130 of the face skin 102 includes a plurality of incrementally spaced second openings 137 extending through its thickness. Preferably, the second openings 137 can be of the same size and spacing as the first openings 117 in the outer perforated layer 116 such that each the first openings 117 is substantially aligned with one of the second openings 137.

The honeycomb core 114 can be constructed of a metallic or a composite material of a type well known in the art. For example, the core 114 can be a fiberglass honeycomb core having a cell size from about 3/16 inch to about 3/4 inch, and a core depth from about 0.5 inch to about 2 inches. A cellular core 114 having other cell shapes, cell sizes, cell depths, and material of construction also can be used As described in detail below, the perforated outer face skin 116 and perforated inner face skin 130 can be bonded to the porous layer 118 by an adhesive 160 of a type known in the art. For example, the face skins 116, 130 can be bonded to the porous layer 118 by a low-flow or no-flow adhesive system, such as nitride phenol adhesive, or the like.

Figure 5A:
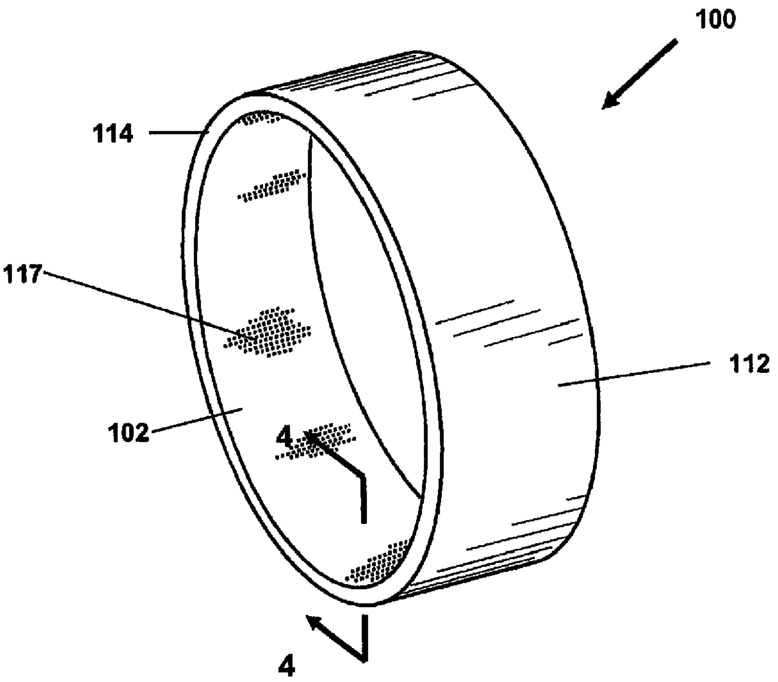
FIG. 5A is a perspective view of one embodiment of a cylindrical SDOF linear acoustic liner according to the invention.
Figure 5B:
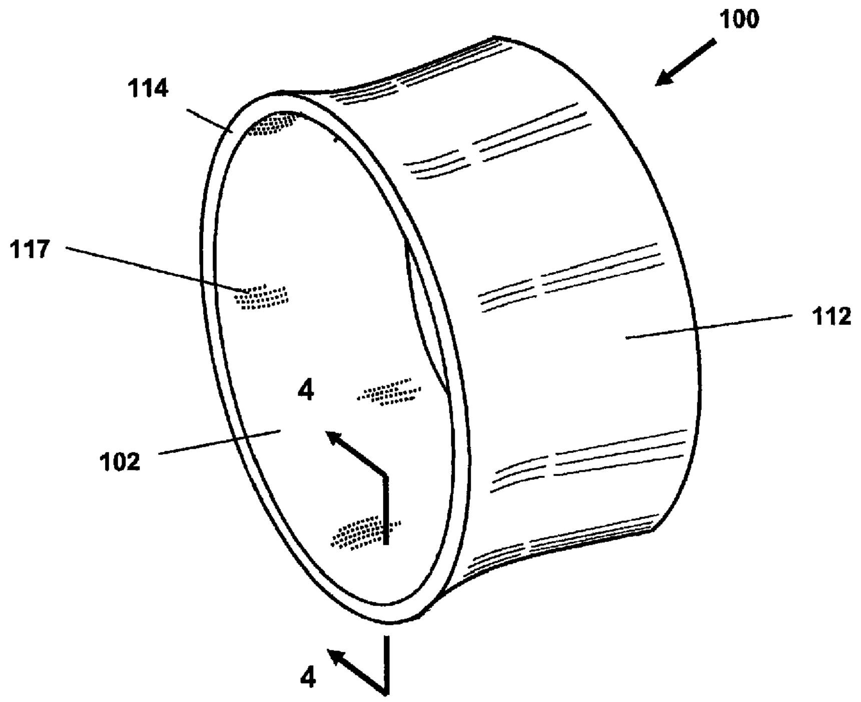
FIG. 5B is a perspective view of one embodiment of a 360-degree SDOF linear acoustic liner according to the invention having compound curvatures.

As shown in FIG. 5, one embodiment of a liner 100 according to the invention can be constructed as a unitary 360-degree structure having no longitudinal seams. Alternatively, a liner 100 according to the invention can be constructed in two or more segments, and joined together along two or more longitudinal seams. Because hardware and materials commonly used to connect the edges of liner segments can sometimes block at least some of the openings 117, 137 in the face skin 102, a seamless liner 100 is preferable in order to maximize the surface area of the liner 100 having unobstructed openings 117, 137 and the associated noise attenuation properties. In the embodiment shown in FIG. 5, a liner 100 according to the invention has a substantially cylindrical shape. Alternatively, the liner 100 can be constructed as a seamless unitary structure having a substantially conical or other non-cylindrical shape.

Figure 6A:
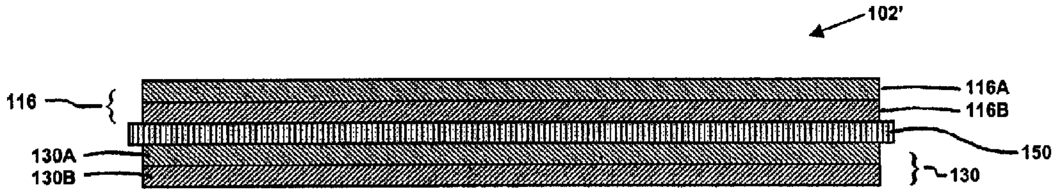
FIG. 6A is a cross-sectional view of a preliminary face skin assembly for use in constructing an SDOF linear acoustic liner like that shown in FIGS. 3-5B.
Figure 6B:
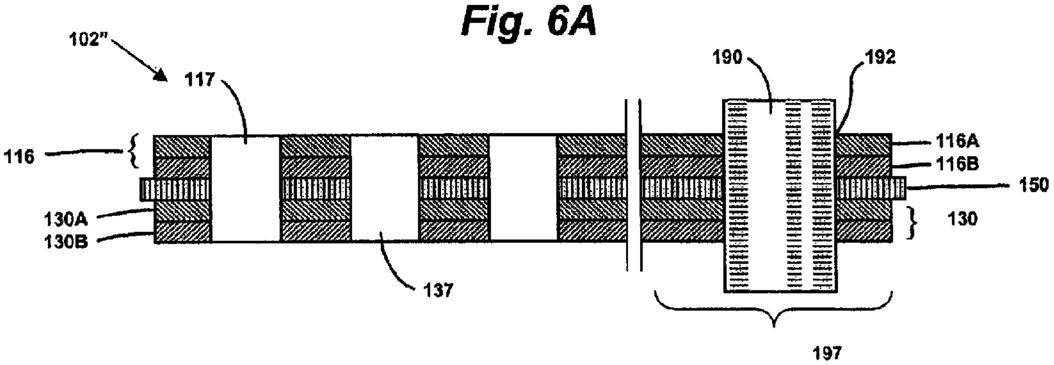
FIG. 6B is a cross-sectional view of the preliminary face skin assembly shown in FIG. 6A after perforating.
Figure 6C:
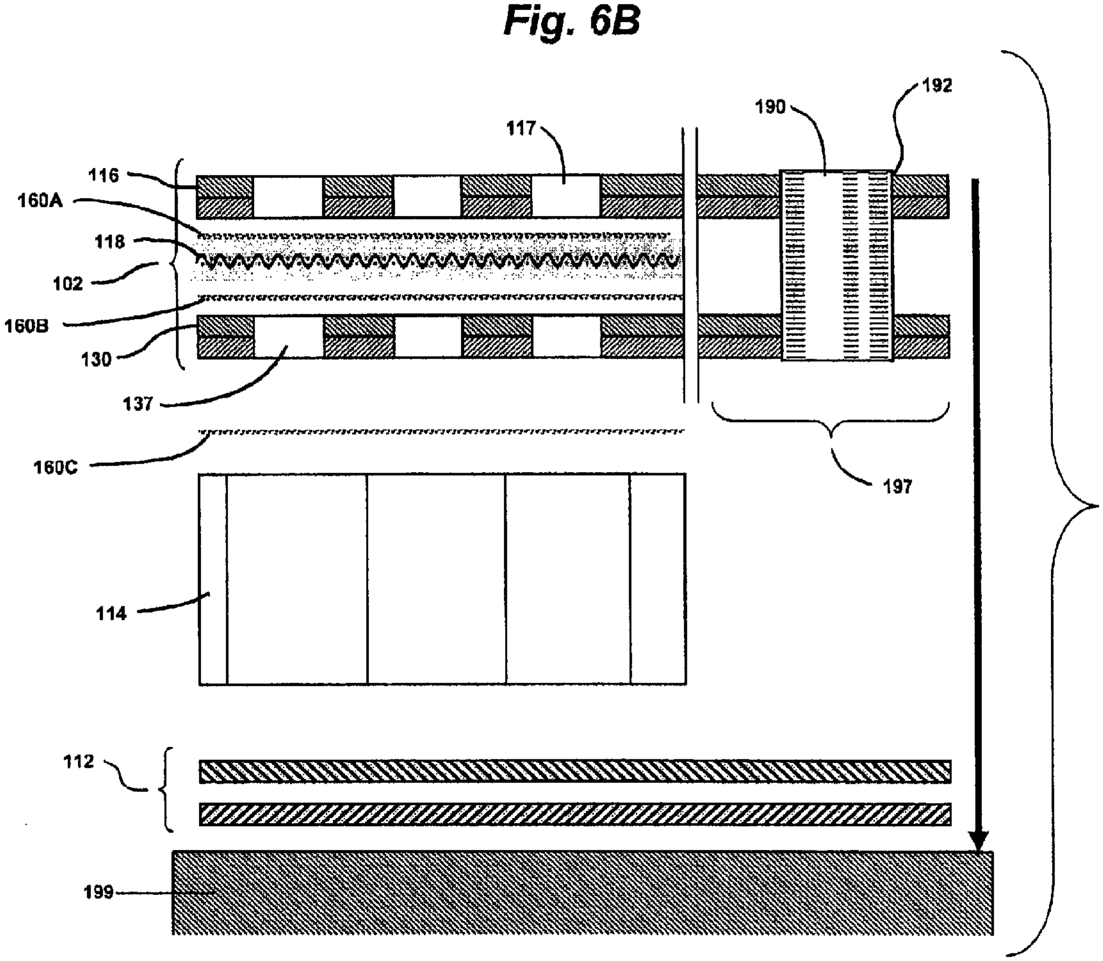
FIG. 6C is an exploded assembly view of a portion of the SDOF linear acoustic liner shown in FIGS. 3-5B and including the perforated face skin shown in FIG. 6B.
Figure 7:
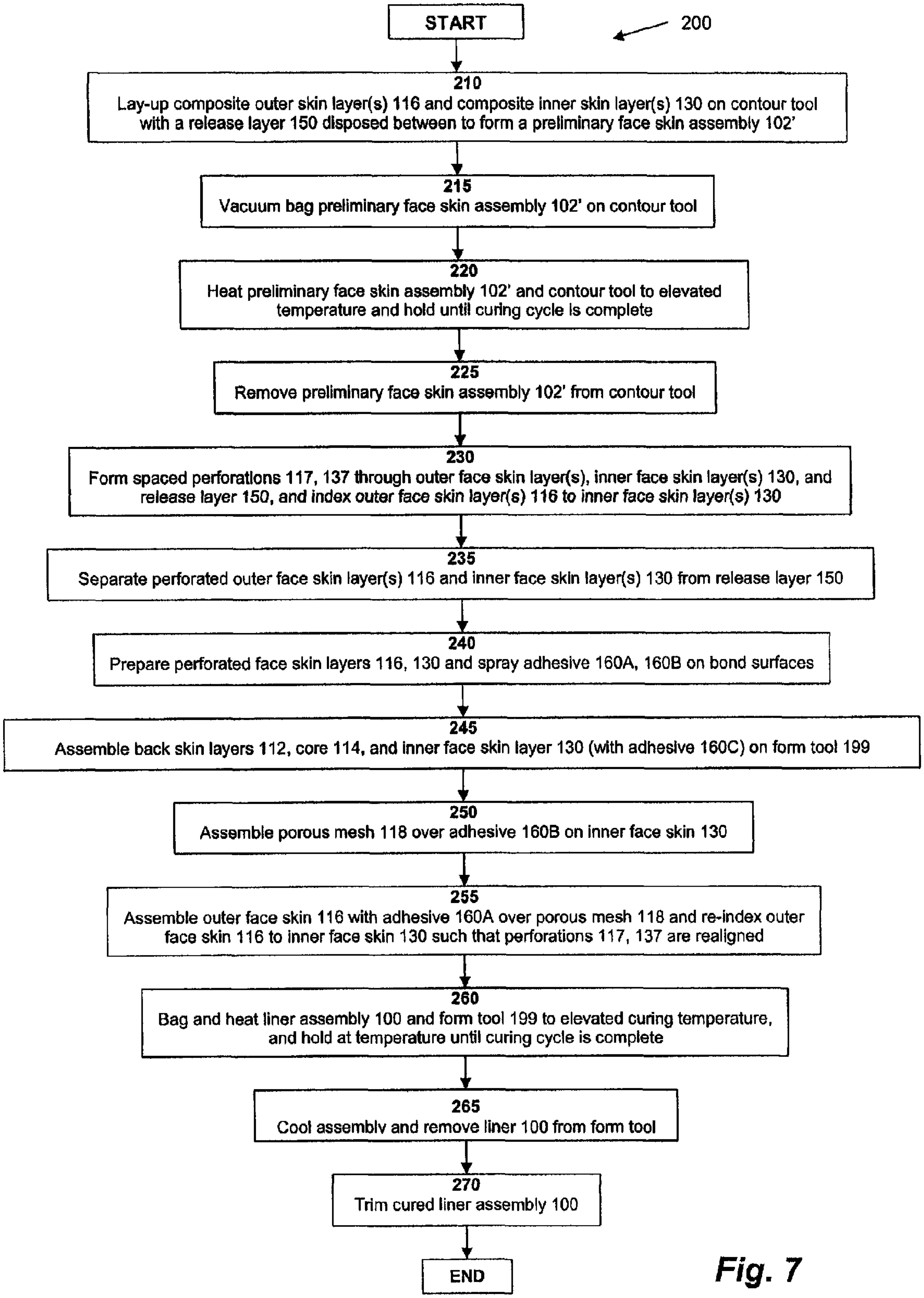
FIG. 7 is a flow chart showing one embodiment of a process for producing a SDOF linear acoustic liner like that shown in FIGS. 3-5B by the process illustrated in FIGS. 6A-6C.

FIG. 7 shows flowchart of steps 210-270 that can be used in a method 200 of producing a SDOF linear acoustic liner 100 like that shown in FIGS. 3-5. FIGS. 6A-6C show the liner 100 in various stages of production using the method 200 shown in FIG. 7. In a first step 210 and as shown in FIG. 6A, a preliminary face skin assembly 102' can be constructed by first assembling the outer face skin layers 116 and the inner face skin layers 130 with a release layer 150 disposed therebetween. The release layer 150 can be sheet of porous material that will not adhere to the skin layers 116, 130 when the composite layers are cured. For example, the release layer can be a peel ply layer of a type well known in the art. The layers of the preliminary face skin assembly 102' can be assembled on a 360-degree contour tool of a type known in the art in order to impart the preliminary face skin assembly 102' with a desired shape. In step 215, the preliminary face skin assembly 102' and contour tool are placed inside a vacuum bag of a type known in the art in preparation for curing the composite layers 116, 130. The bagged face skin 102' and contour tool are then heated 220 to an elevated temperature and held at the elevated temperature for a sufficient time to cure the composite layers 116, 130. For example, the composite plies 116, 130 of the face skin 102' can be cured at about 355 degrees Fahrenheit at a pressure of about 70 pounds per square inch (PSI) for about 120 minutes. Other temperatures, pressures and curing times also may be used depending upon the curing requirements for the particular composite materials used. Once cooled, the cured preliminary face skin assembly 102" can be removed 225 from the contour tool for perforating.

As shown in FIG. 6B, first openings 117 and second openings 137 are formed 230 in the cured preliminary face skin assembly 102". Preferably, the first and second openings 117, 137 are simultaneously formed through the layers 116, 150, 130 such that the openings 117, 137 are precisely aligned with each other and have the same size and shape. The openings 117, 137 can be formed by any suitable method, including abrasive blasting, mechanical drilling, laser drilling, water jet drilling, punching, and the like. As also shown in FIG. 6B, the alignment between the outer face skin layers 116 and the inner face skin layers 130 can be registered or indexed by forming one or more tooling holes 192 through the layers 116, 130, and inserting a close-fitting position pin 190 into each tooling hole 192. As shown in FIG. 6B, such tooling hole(s) 192 can be located in a region of excess material 197 that may be trimmed away once the liner 100 is complete. Once the first openings 117 and second openings 137 have been formed in the face skin assembly 102", the perforated outer face skin layers 116 and the perforated inner face skin layers 130 can be manually separated 235 from the release layer 150 using a simple peeling tool such as a thin parting tool, or the like.

The outer skin layers 116, 130 can be prepared 240 for final assembly by applying a spray adhesive 160 to those surfaces of the skins 116, 130 that will contact the porous layer. As shown in FIG. 6C, a first layer of adhesive coating 160A can applied to the inside surface of the outer face skin layers 116, and a second layer of adhesive coating 160B can be applied to the outer surface of the inner face skin layers 130. In addition, a third layer of adhesive coating 160C may be applied to the inner surface of the inner face skin layers 130 to enhance bonding between the inner face skin 130 and the honeycomb core 114. Any type of suitable spray adhesive 160 can be used. For example, the adhesive 160 may be a low-flow or no-flow adhesive system such as a nitride phenol adhesive. Care should be taken when applying the adhesive layers 160A-160C to avoid blocking the openings 117, 137 in the face skins 116, 130 with excess adhesive material 160.

One embodiment of a final lay-up sequence of the liner 100 is shown in FIG. 6C. First, the composite back skin layers 112 the core 114, and the perforated inner face skin layer 130 (with optional adhesive layer 60C) can be assembled 245 on a forming surface of a form tool 199. The porous layer 118 then can be assembled 250 over the adhesive layer 160B on the inner face skin 130. Lastly, the outer face skin layer 116 with adhesive layer 160B can be assembled 255 over the porous layer 118. When assembled, the first openings 117 in the outer face skin 116 should substantially align with the corresponding openings 137 in the inner face skin 130. The tooling hole(s) 192 and pin(s) 190 can be used to re-index the face skin layers 116, 130 to reestablish precise alignment of the openings 117, 130, and to maintain alignment during curing.

The assembled layers and the form tool 199 can be bagged 255 for curing in a manner known in the art. The assembly and tool 199 can be heated to an elevated temperature and maintained at the elevated temperature for a sufficient time to cure the composite materials and bond the layers together. For example, the composite materials may be cured at about 355 degrees Fahrenheit at a pressure of about 70 pounds per square inch (PSI) for about 120 minutes. Other temperatures, pressures and times also may be used depending upon the cure requirements for the composite materials selected.

Once cooled, the cured liner assembly 100 can be removed 265 from the form tool 199. The cured assembly then can be trimmed 270 to complete production of the acoustic liner 100.

In an alternative embodiment of a lay-up sequence, the opposed faces of the perforated outer face skin 116 and the perforated inner face skin 130 can be sprayed with layers of adhesive 160A, 160B, and the porous layer 118 assembled therebetween. Again, one or more alignment pins 190 can be inserted into the tooling holes 192 to establish and maintain the alignment between the first and second openings 117, 137. The assembled layers 116, 118 and 130 then can be bagged and cured in a conventional manner. After the perforated face skin 102 is cured and trimmed, the face skin 102 and the back skin layers 112 can be bonded to the core 114 using a suitable forming tool and conventional composite material bonding techniques.

Various aspects and features of the invention have been described above with reference to various specific embodiments. Persons of ordinary skill in the art will recognize that certain changes and modifications can be made to the described embodiments without departing from the scope of the invention. All such changes and modifications are intended to be within the scope of the appended claims.

What is claimed is:

1. A method of producing a linear acoustic liner, the method comprising:

(a) placing a release layer between at least one outer composite layer and at least one inner composite layer;

(b) restraining the outer and inner composite layers in a desired configuration;

(c) curing the outer and inner composite layers in the restrained configuration;

(d) forming a plurality of spaced openings through the cured outer and inner composite layers;

(e) separating the cured outer composite layer and the cured inner composite layer from the release layer;

(f) inserting a porous layer and a first adhesive material between the cured outer and inner layers and realigning the spaced openings in the outer and inner composite layers;

(g) curing the first adhesive material to form a cured perforated face skin; and (h) bonding the cured perforated face skin to an open cell core.

2. The method according to claim 1, comprising:

placing the cured perforated face skin over a first face of the open cell core with a second adhesive material therebetween; and curing the second adhesive material.

3. The method according to claim 2, further comprising placing at least one back skin layer over a second face of the open cell core and bonding the back skin layer to the second face of the open cell core.

4. The method according to claim 1, comprising:
bonding the cured perforated face skin and an imperforated back skin to opposite faces of an open cell core.

5. The method according to claim 4, wherein the cured perforated face skin and the imperforate back skin layer are bonded to the open cell core at the same time.

6. The method according to claim 4, wherein the back skin layer is bonded to the open cell core after the perforated face skin has been bonded to the open cell core.

7. The method according to claim 1, further comprising:
forming an alignment means in the cured outer and inner composite layers before separating the cured outer composite layer and the cured inner composite layer from the release layer; and
using the alignment means to substantially realign the spaced openings in the outer and inner composite layers with each other.

8. The method according to claim 1, further comprising:
forming the outer composite layer from two or more layers of composite material.

9. The method according to claim 1, further comprising:
forming the inner composite layer from two or more layers of composite material.

10. The method according to claim 1, wherein:
forming a plurality of spaced openings through the cured outer and inner composite layers comprises flowing a stream of pressurized abrasive material through the cured outer and inner composite layers.

11. The method according to claim 1, wherein:
forming a plurality of spaced openings through the cured outer and inner composite layers comprises drilling or punching the spaced openings through the composite layers.

12. A linear acoustic liner produced by a method comprising the steps of:
(a) placing a release layer between at least one outer composite layer and at least one inner composite layer;
(b) restraining the outer and inner composite layers in a desired configuration;
(c) curing the outer and inner composite layers in the restrained configuration;
(d) forming a plurality of spaced openings through the cured outer and inner composite layers;
(e) separating the cured outer composite layer and the cured inner composite layer from the release layer;
(f) inserting a porous layer and a first adhesive material between the cured outer and inner layers and realigning the spaced openings in the outer and inner composite layers;
(g) curing the first adhesive material to form a cured perforated face skin; and
(h) bonding the cured perforated face skin to an open cell core.

* * * * *